US006998912B2

(12) United States Patent
Kushitani et al.

(10) Patent No.: US 6,998,912 B2
(45) Date of Patent: Feb. 14, 2006

(54) HIGH-FREQUENCY COMPOSITE SWITCH MODULE AND MOBILE COMMUNICATION DEVICE USING THE SAME

(75) Inventors: Hiroshi Kushitani, Osaka (JP); Yuki Satoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 10/470,356

(22) PCT Filed: Sep. 11, 2002

(86) PCT No.: PCT/JP02/09259

§ 371 (c)(1),
(2), (4) Date: Jul. 23, 2003

(87) PCT Pub. No.: WO03/026155

PCT Pub. Date: Mar. 27, 2003

(65) Prior Publication Data

US 2004/0075491 A1 Apr. 22, 2004

(30) Foreign Application Priority Data

Sep. 14, 2001 (JP) .............................. 2001-279932

(51) Int. Cl.
*H03F 1/14* (2006.01)
(52) U.S. Cl. .................... 330/51; 333/133; 333/193; 333/1.1; 333/24.2; 455/78; 455/82; 455/83
(58) Field of Classification Search ................ 333/133, 333/193, 1.1, 24.2; 455/78, 82, 83; 330/51
See application file for complete search history.

(56) References Cited

U.S. PATENT DOCUMENTS

| 3,787,739 | A | * | 1/1974 | Cowpland et al. ........... 327/439 |
| 6,124,553 | A | * | 9/2000 | Narizuka et al. ............ 174/260 |
| 6,222,426 | B1 | * | 4/2001 | Komazaki et al. ........... 333/133 |
| RE37,639 | E | * | 4/2002 | Ehara et al. ................. 333/193 |
| 6,721,544 | B1 | * | 4/2004 | Franca-Neto ................. 455/83 |
| 2001/0017576 | A1 | * | 8/2001 | Kondo et al. ............... 333/24.2 |

FOREIGN PATENT DOCUMENTS

| JP | 8-237165 | 9/1996 |
| JP | 10-32521 | 2/1998 |

(Continued)

OTHER PUBLICATIONS

International Search Report for PCT Application No. PCT/JP02/09259 mailed Jan. 14, 2003.

(Continued)

*Primary Examiner*—Michael B. Shingleton
(74) *Attorney, Agent, or Firm*—RatnerPrestia

(57) ABSTRACT

A high frequency composite switch module for a mobile communication device, wherein high frequency circuits such as a power amplifier, a circuit functioning as a transmitter/receiver switching circuit, a surface acoustic wave (SAW) filter for reception, and the like are modularized into one unit. A transmitter circuit includes a transmitter side impedance converter comprising an impedance matching circuit and an impedance converter circuit, a power amplifier and a power supply unit. A receiver circuit includes a receiver-side impedance converter comprising a phase shifting circuit and a SAW filter. The power amplifier and the impedance converter circuit are integrated into one IC chip. At least one of the matching circuit, the power supply unit and the phase shifting circuit is formed inside a multilayer board comprised of a conductor layer and a dielectric layer. The IC chip and the SAW filter are also mounted on the multilayer board.

27 Claims, 10 Drawing Sheets

FOREIGN PATENT DOCUMENTS

| | | |
|---|---|---|
| JP | 11-154804 | 6/1999 |
| JP | 11-312987 A | 11/1999 |
| JP | 2001-211097 | 8/2001 |

OTHER PUBLICATIONS

Form PCT/ISA/210 English Translation.

* cited by examiner

HIGH-FREQUENCY COMPOSITE SWITCH MODULE AND MOBILE COMMUNICATION DEVICE USING THE SAME

This application is a U.S. National Phase applicationn of PCT International application PCT/JP02/09259.

TECHNICAL FIELD

The present invention relates to a high frequency circuit module adapted for use in a mobile communication device such as a portable phone.

BACKGROUND ART

With widespread use of mobile telecommunications such as portable phones, there is an upward trend in use of mobile communication devices that have facilities to use two different communication systems such as the dual-band cellular telephone system.

Any such telecommunication device hitherto often shares an antenna for both of the two communication systems. The device requires two channels of transmitter circuit and receiver circuit independently for the respective communication systems. Each of them is selected with a switch for making a communication. In general, a high frequency section in any of these transmitter circuits comprises a power amplifier, a low pass filter, and the like. A high frequency section in any of the receiver circuits comprises an impedance matching circuit, a surface acoustic wave filter (hereinafter referred to as SAW filter), and the like.

One of these transmitter circuits and receiver circuits is put into connection with the antenna when in operation. For this purpose, a transmitter/receiver switching circuit using a PIN diode is provided at an antenna side of each circuit, and it is operated under the control of a logic circuit. Telecommunication is thus accomplished in any of the two different communication systems.

Normally, high frequency sections of the mobile communication devices are modularized and built into the devices for simplification of the design and manufacturing ease of the communication devices in most cases. They are frequently called high frequency composite switch modules, high frequency circuit modules, high frequency front-end modules and the like.

FIG. 12 and FIG. 13 show one example of the high frequency composite switch modules which have been used heretofore in the mobile communication devices designed for two different communication systems. FIG. 12 is an exploded perspective view, and FIG. 13 is a block diagram of the same.

In this module, a wiring pattern of a transmitter/receiver switching circuit, i.e. the switching circuit for selecting between a transmission signal and a reception signal, and low pass filters (LPF) 1206 in transmitter circuits shown in FIG. 13 are composed of conductor patterns 1202 disposed inside a multilayer board formed by stacking a plurality of dielectric layers 1201, as shown in FIG. 12. Besides, PIN diodes 1203, SAW filter 1204, and chip components 1205, which constitute the switching circuit, are mounted on an outer surface of the multilayer board.

In this device here, the SAW filter 1204 is used as a band pass filter (BPF) of the receiver circuit shown in FIG. 13.

Also, Single-Pole Double-Throw (SPDT) switch 1207 is composed of conductor patterns 1202 in the multilayer board, PIN diodes 1203 and chip components 1205.

A power amplifier is not included in this module, but it is arranged separately for the reason of heat and dimension. As a result, it requires additional transmission lines as signal paths for connection between the module and the power amplifier. Moreover, it is necessary to separately provide additional wiring for power supply to both of these components.

Furthermore, this module uses a switching circuit having PIN diodes for selection between the two communication systems as well as between the transmission and reception signals. This module contains four PIN diodes, chip components and wiring patterns as the constituent components. Consequently, a scale of the circuit becomes inevitably large, the circuit structure becomes complicated, and a large number of components also become necessary. Accordingly, since they increase a transmission loss in the signal wires, a transmission power at an antenna end and a receiving power at an input terminal of the receiver circuit decrease to that extent. In other words, an overall efficiency of the mobile communication device decreases in respect to the transmission power and the receiving power.

DISCLOSURE OF THE INVENTION

It is an object of this invention to provide a small, simple, low-priced, and highly efficient high frequency composite switch module for use in a mobile communication device. In this high frequency composite switch module, high frequency circuits such as a power amplifier, a circuit that functions as a transmitter/receiver switching circuit, a band pass filter for reception and the like are integrated into one body.

This high frequency composite switch module is provided with a common terminal to which both a transmitter circuit and a receiver circuit are connected together. In the transmitter circuit and the receiver circuit, their respective transmission signal and reception signal are switched equivalently with respect to one another through the common terminal.

Here, the transmitter circuit includes a transmitter side impedance converter, an amplifier, and a power supply unit. The transmitter side impedance converter comprises an impedance matching circuit and an impedance converter circuit, and it reflects the reception signal when in receiving operation. The amplifier amplifies the transmission signal to a predetermined level. The power supply unit supplies electric power to the amplifier.

In the receiver circuit, the receiver side impedance converter comprises a phase shifting circuit and a SAW filter, and it reflects the transmission signal when in transmitting operation.

Also, the amplifier and the impedance converter circuit are formed in a single IC chip. Furthermore, at least one of the impedance matching circuit, the power supply unit, and the phase shifting circuit is formed inside a multilayer board which comprises a conductor layer and a dielectric layer. Moreover, at least one of the IC chip and the SAW filter is mounted on an outer layer of the multilayer board.

With the module composed as described, the transmission signal and the reception signal in the transmitter circuit and the receiver circuit are reflected at an entry port of the respective other circuit. Therefore, switching operation for the transmission and reception signals is made equivalently. In other words, the high frequency circuit section can be downsized and simplified, since it does not require a transmitter/receiver switching circuit such as the conventional one, and thereby realizing a reduction in cost as well as low loss in handling the signals. Also, since the amplifier and the peripheral circuits are integrated into one chip, the transmission signal lines can be shortened, and loss of the transmission signals can be reduced.

In another embodiment of this invention, there is provided a high frequency composite switch module adapted for use with two different communication systems.

This high frequency composite switch module comprises a wave splitter circuit for separating signals of two communication bands used for the two different communication systems, and transmitter circuits and receiver circuits for processing the signals of the two communication bands respectively.

Also, an amplifier and an impedance converter circuit for each of the communication systems are respectively composed of one IC chip.

In addition, at least one of an impedance matching circuit, a power supply unit and a phase shifting circuit for each of the communication systems is formed inside a multilayer board which comprises a conductor layer and a dielectric layer. Furthermore, at least one of the IC chip and a SAW filter corresponding to each of the communication systems is mounted on an outer layer of the multilayer board. The module is thus downsized and simplified, and thereby this module of low signal loss can be supplied at low price.

DETAILED DESCRIPTION OF THE PREFERRED EMBODIMENTS

Referring now to FIG. 1 through FIG. 11, exemplary embodiments of the present invention will be described hereinafter.

A high frequency composite switch module described below includes a power amplifier and a switching circuit. Therefore, this can provide the module which is downsized, simplified, reduced in cost, and improved in it performances for the whole of the high frequency circuits.

(First Exemplary Embodiment)

Figure 1:
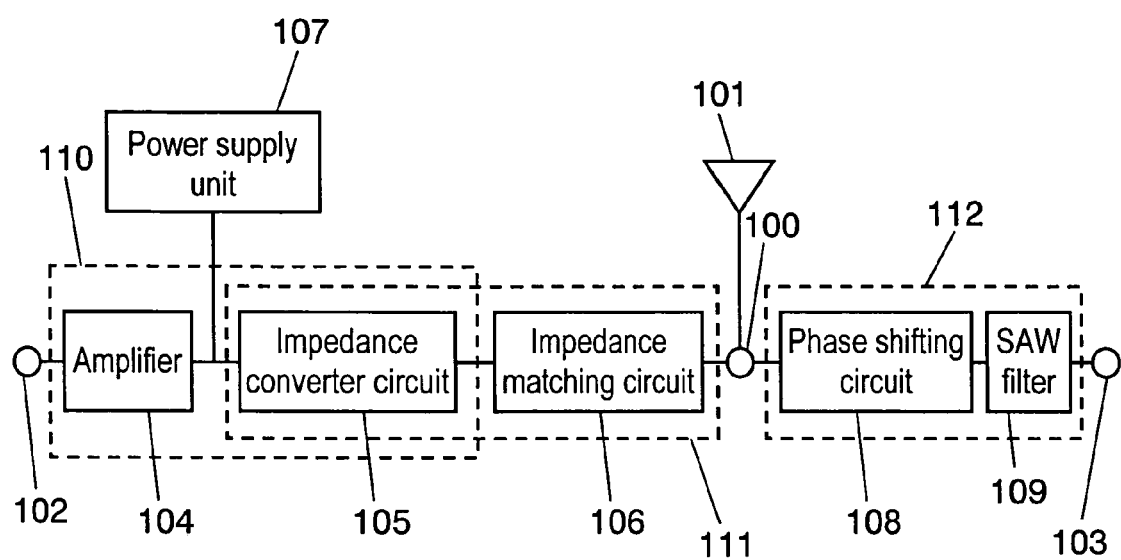
FIG. 1 is a block diagram of a high frequency composite switch module according to a first exemplary embodiment of the present invention.

FIG. 1 is a block diagram of a high frequency composite switch module according to the first exemplary embodiment of this invention.

In this module, amplifier 104 and transmitter-side impedance converter 111 are connected between transmission terminal 102 and common terminal 100 in a transmitter circuit, as shown in FIG. 1. Power supply unit 107 is connected between amplifier 104 and transmitter-side impedance converter 111.

Transmitter-side impedance converter 111 comprises impedance converter circuit 105 and impedance matching circuit 106 in order to pass and reflect transmission signal and reception signal respectively to the maximum extent possible. In this embodiment, amplifier 104 and impedance converter circuit 105 are integrated into one IC chip 110.

In a receiver circuit, receiver-side impedance converter 112 is connected between common terminal 100 and receiving terminal 103. Receiver-side impedance converter 112 comprises phase shifting circuit 108 and SAW filter 109 in order to pass and reflect the reception signal and the transmission signal respectively to the maximum extent possible.

Figure 2:
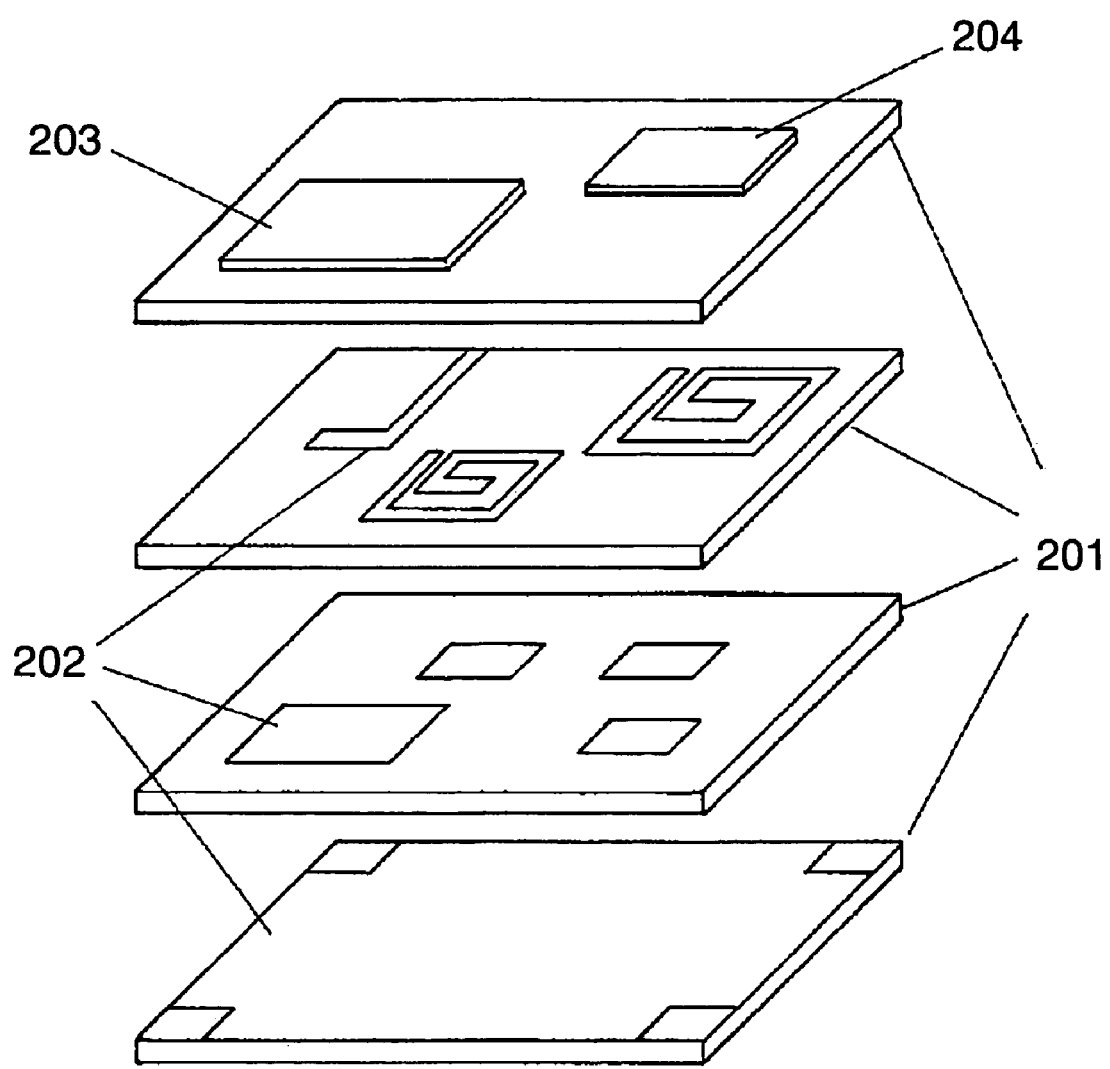
FIG. 2 is an exploded perspective view of the high frequency composite switch module according to the first exemplary embodiment of the present invention.

FIG. 2 is an exploded perspective view of the high frequency composite switch module of this first exemplary embodiment.

An impedance matching circuit, a power supply unit and a phase shifting circuit are composed of interlayer conductor patterns 202, each formed between respective two of a plurality of dielectric layers 201, as shown in FIG. 2. In addition, IC chip 203 and SAW filter 204 are mounted on the outermost one of dielectric layers 201. IC chip 203 in this figure corresponds to aforesaid IC chip 110 in which amplifier 104 and impedance converter circuit 105 are integrated. Also, SAW filter 204 corresponds to SAW filter 109.

The high frequency composite switch module constructed as above operates in a manner which is described hereinafter.

When in transmission, power supply unit 107 supplies a bias current to turn the amplifier 104 into an operating mode. A transmission signal input from transmission terminal 102 is input to impedance converter circuit 105 after amplified by amplifier 104. The impedance is not converted here, but the signal is input to matching circuit 106 which carries out impedance matching.

A circuit constant of phase shifting circuit 108 is set to such a value that makes an input impedance of SAW filter 109 the highest in a frequency band of the transmission signal as measured from common terminal 100. As a result, this makes the impedance sufficiently high in a direction from common terminal 100 toward receiving terminal 103. Therefore, most of the transmission signal is reflected at an input port of the receiver circuit, and most of the transmission signal is output from antenna terminal 101.

When in reception, on the other hand, reception signal input from antenna terminal 101 passes through phase shifting circuit 108, and only a part of the signal in a frequency band of the reception signal passes SAW filter 109 and is output to receiving terminal 103.

A circuit constant of impedance converter circuit 105 is set to such a value that makes an impedance of impedance converter circuit 105 sufficiently high in the receiving frequency band as measured from common terminal 100. As a result, this makes the impedance sufficiently high in a direction from common terminal 100 toward transmission terminal 102. Therefore, most of the reception signal is reflected at an output port of the transmitter circuit, and most of the reception signal is output from the receiving terminal 103.

Here, a power supply to impedance converter circuit 105 may be provided by sharing the power supply for amplifier 104. In this case, a number of logic circuits for controlling the power supply can be reduced by one in the mobile communication device employing this module, thereby contributing to a reduction in size of the circuit.

Besides, impedance converter circuit 105 may be comprised of a circuit using any of a field-effect transistor, a PIN diode and a varactor diode, or a switch using a gallium arsenide semi-conductor. Any of these circuits can be integrated easily into a single IC chip with the amplifier. Also, a manufacturing cost of it remains virtually unchanged from that of the case in which only the amplifier is integrated into an IC chip.

Figure 3:
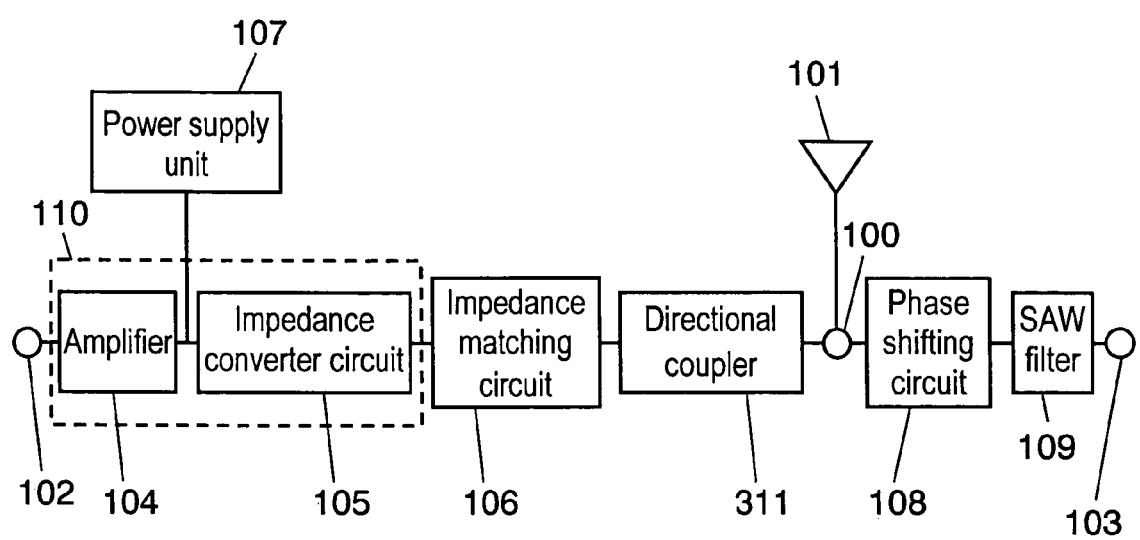
FIG. 3 is a block diagram showing another architectural example of the high frequency composite switch module according to the first exemplary embodiment of the present invention.

Furthermore, directional coupler 311 may be disposed between impedance matching circuit 106 and common terminal 100, as shown in FIG. 3. When this is the case, an auxiliary line of directional coupler 311 can be used as a monitor terminal for monitoring an output signal, so as to make the module highly functional.

Moreover, directional coupler 311 can be composed using a conductor pattern formed inside the multilayer board. In this case, it realizes the module provided with a monitor terminal without increasing its size. In addition, the conductor pattern composing directional coupler 311 may be formed so that it is electromagnetically coupled to a conductor pattern which functions as an inductor constituting the impedance matching circuit and connected in series to a flow of the signal. In this way, the directional coupler can be integrated with the impedance matching circuit. Therefore, it can accomplish not only an increase in functions of the module but also a reduction in size. Additionally, it can improve design flexibility of the conductor pattern.

Figure 4:
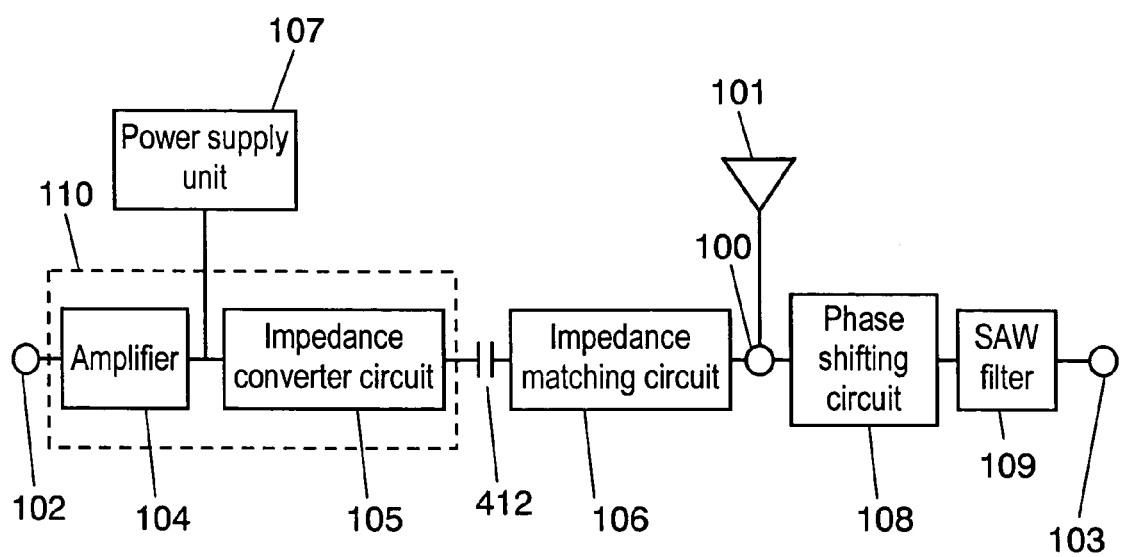
FIG. 4 is a block diagram showing still another architectural example of the high frequency composite switch module according to the first exemplary embodiment of the present invention.

Furthermore, Direct Current (DC) blocking capacitor 412 may be disposed between impedance converter circuit 105 and impedance matching circuit 106, as shown in FIG. 4. Power consumption can be reduced in this case, because it prevents the DC supplied to amplifier 104 and impedance converter circuit 105 from flowing toward other circuit components.

In addition, the circuit between impedance converter circuit 105 and common terminal 100 may be so constructed as to produce a phase difference equal to an integral multiple of one-half wavelength of the receiving frequency band, while amplifier 104 is not in operation. In this case, an impedance of the circuit in a direction from common terminal 100 toward transmission terminal 102 increases sufficiently as it becomes equal to an output impedance of the amplifier in the receiving frequency band. Most of the reception signal is therefore reflected at an output port of the transmitter circuit, and it hardly appears at transmission terminal 102.

What has been described above is a variety of structures useful for the transmitter circuit, whereas the following structures are available for the receiving circuit.

Phase shifting circuit 108 may be composed of a conductor pattern which functions as an inductor connected in series to a signal line and a capacitor connected in parallel between the signal line and the ground. This can reduce a size of phase shifting circuit 108.

Also, it is desirable that SAW filter 109 has 0.8 or greater in level of reflection coefficient to input in the transmission frequency band. In this case, an impedance of the receiving circuit in a direction from common terminal 100 toward receiving terminal 103 increases to a sufficiently high value in the transmission frequency band. Therefore, most of the transmission signal is reflected at an input port of the receiver circuit, and it hardly appears at receiving terminal 103.

Moreover, at least one of parallel capacitors connected between the ground and the signal line in matching circuit 106 may be replaced with a varistor. In this case, the module can be protected from surge voltages and surge currents induced by lightning and the like.

Figure 5:
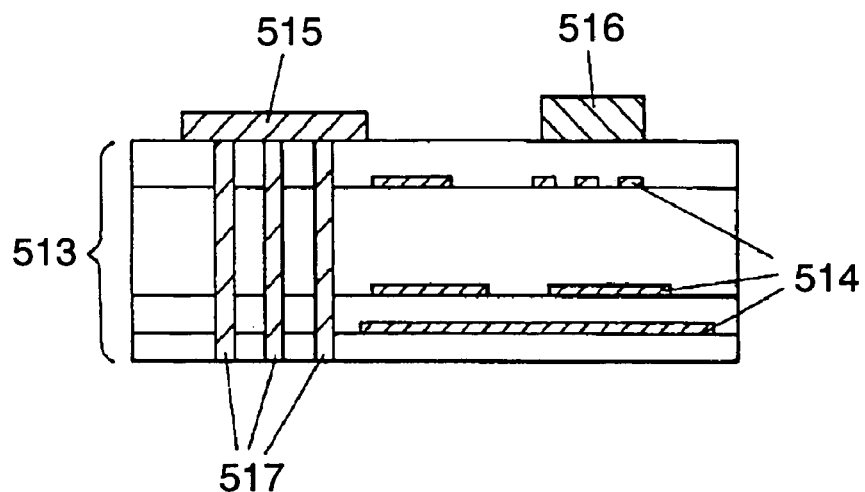
FIG. 5 is a cross sectional view showing another structural example of the high frequency composite switch module according to the first exemplary embodiment of the present invention.

Furthermore, dielectric layers 513 may be provided with thermal via holes 517 formed underneath IC chip 515 mounted on the multilayer board, as shown in FIG. 5. When this is the case, heat generated by IC chip 515 is effectively dissipated through these via holes 517. In this case here, IC chip 515 corresponds to IC chip 110.

In the structure shown in FIG. 5, SAW filter 516 corresponding to IC chip 515 and SAW filter 109 is mounted on an outer layer of the multilayer board.

Figure 6:
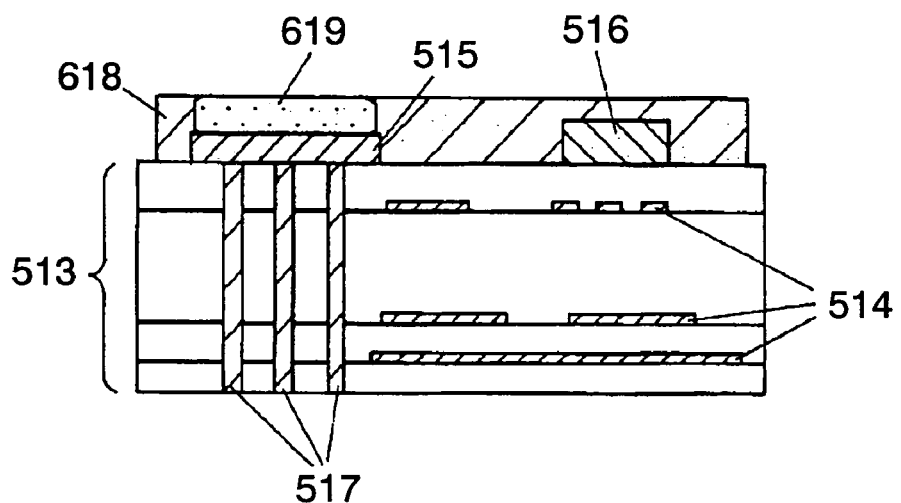
FIG. 6 is a cross sectional view showing another structural example of the high frequency composite switch module according to the first exemplary embodiment of the present invention.

In addition, the structure may be so arranged that shielding case 618 is placed to cover IC chip 515 and SAW filter 516, and case 618 is bonded to IC chip 515 with conductive resin 619, as shown in FIG. 6. This structure can also effectively dissipate the heat generated by IC chip 515. Here, interlayer conductor patterns 514 are formed in a manner that they are held sandwiched between dielectric layers 513, as shown in FIG. 6.

Figure 7:
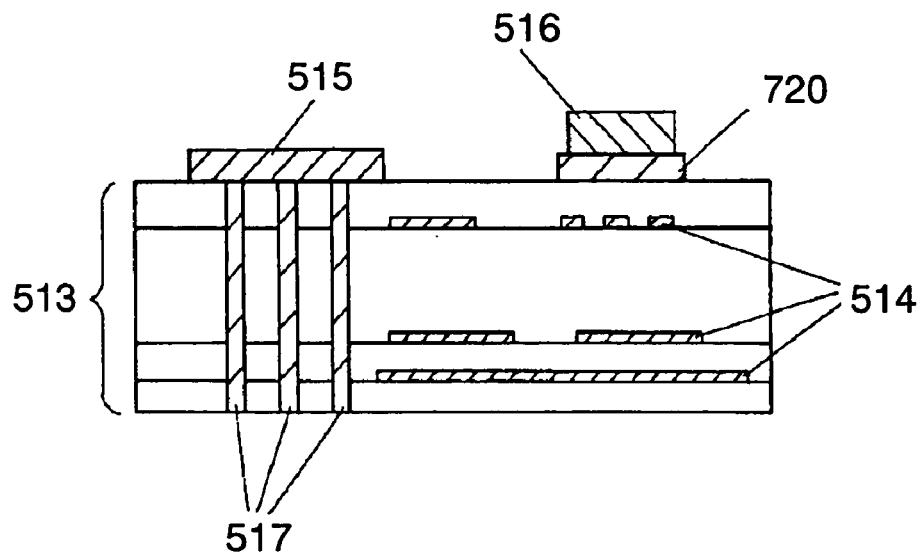
FIG. 7 is a cross sectional view showing still another structural example of the high frequency composite switch module according to the first exemplary embodiment of the present invention.

Also, as shown in FIG. 7, the structure may be such that silicon dioxide layer 720 is provided between the multilayer board and SAW filter 516. In the case of this structure, the heat generated by IC chip 515 does not transmit easily to SAW filter 516. It can thus improve a temperature characteristic of SAW filter 516.

Figure 8:
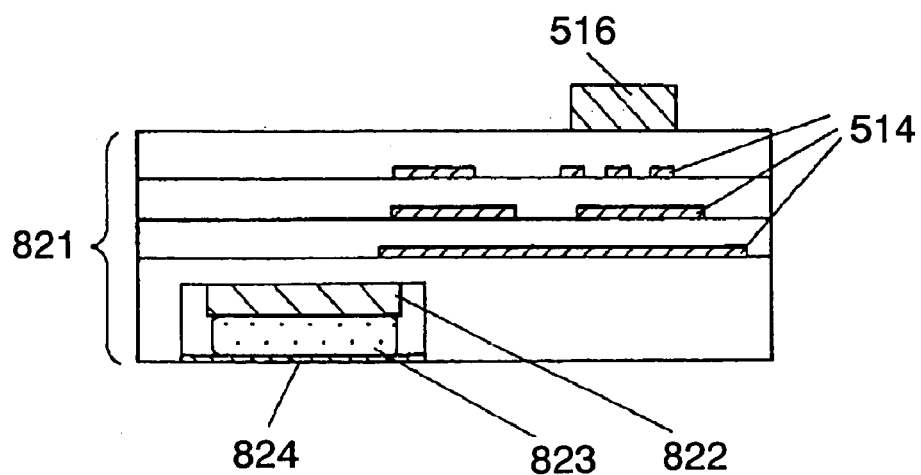
FIG. 8 is a cross sectional view showing still another structural example of the high frequency composite switch module according to the first exemplary embodiment of the present invention.
Figure 9:
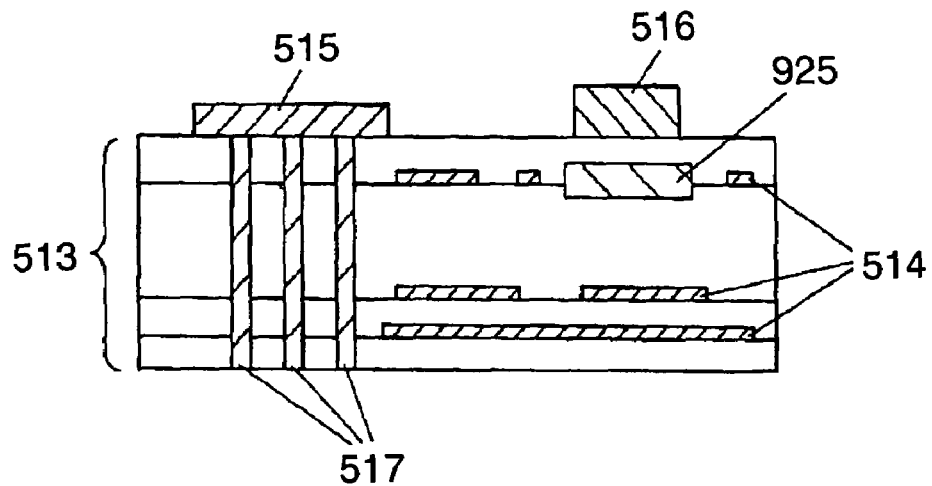
FIG. 9 is a cross sectional view showing still another structural example of the high frequency composite switch module according to the first exemplary embodiment of the present invention.

Alternatively, the structure can be such that the multilayer board is provided with a recess in the bottom surface and IC chip 822 is placed in the recess while SAW filter 516 is mounted on the upper surface of the multilayer board as shown in FIG. 8. In this structure, the recess in the multilayer board is covered with metal plate 824 bonded to IC chip 822 with conductive resin 823, as shown in FIG. 8. The heat generated by IC chip 822 is efficiently dissipated also in this case. Furthermore, the multilayer board may be provided with room layer 925 as shown in FIG. 9, instead of forming the multilayer board by consecutively stacking conductor layers and dielectric layers without any space therebetween. Air layer in the room layer in this structure also makes the heat generated by IC chip 515 difficult to transmit to SAW filter 516, so as to improve the temperature characteristic of SAW filter 516.

In addition, it is appropriate to fill room layer 925 with thermal insulation resin. Since the insulation resin in this case prevents the heat generated by IC chip 515 from transmitting to SAW filter 516, it also improves the temperature characteristic of SAW filter 516.

Figure 10:
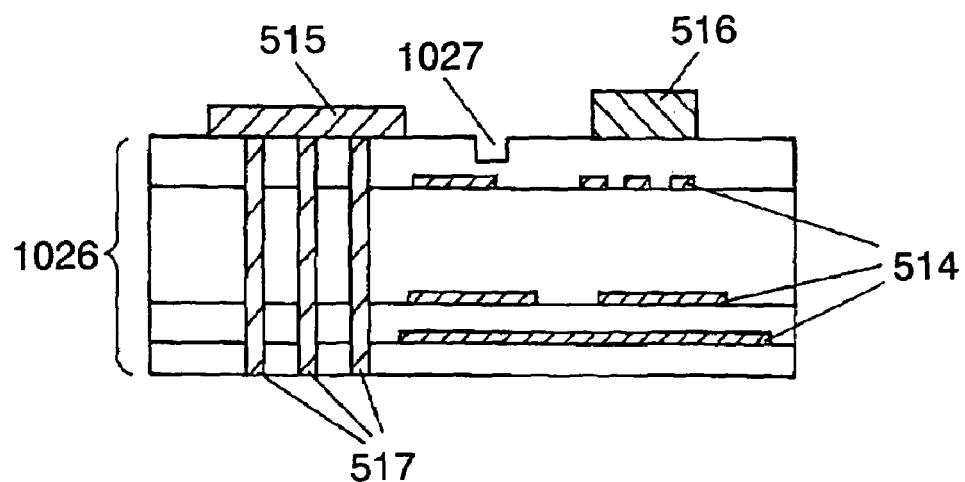
FIG. 10 is a cross sectional view showing yet another structural example of the high frequency composite switch module according to the first exemplary embodiment of the present invention.

Moreover, the multilayer board may be provided with groove 1027 between IC chip 515 and SAW filter 516 mounted on it, as shown in FIG. 10, instead of it having a flat upper surface. Since the groove also prevents the heat generated by IC chip 515 from transmitting to SAW filter 516, it improves the temperature characteristic of SAW filter 516.

In what have been described above, the IC chip is placed to the outer surface or in the recess of the multilayer board. Alternatively, the SAW filter may be placed on the outer surface or in the recess of the multilayer board.

In the structure of the present exemplary embodiment, there can be numerous variations in the type of the multilayer board and the method of fabrication, structure of the impedance matching circuit, the power supply circuit and the phase shifting circuit formed in the multilayer board, and the method of forming them in the multilayer board, and structure of the amplifier and the impedance converter circuit, and the method of forming them in the IC chip. However, the present invention is not restrictive only to those detailed above.

In the module of this exemplary embodiment as described above, amplifier 104 and the impedance converter circuit 105 are included in one IC chip 203 (refer to FIG. 2), and mounted to the module. In addition, this module does not require a conventional transmitter/receiver switching circuit, since it functions equivalently as the transmitter/receiver switching circuit. A small, simple, and low-priced high frequency composite switch module can be thus provided.

In addition, this module can provide a signal line of low loss because of the small size. It can therefore improve an overall efficiency of transmission power and reception power of the antenna.

(Second Exemplary Embodiment)

Figure 11:
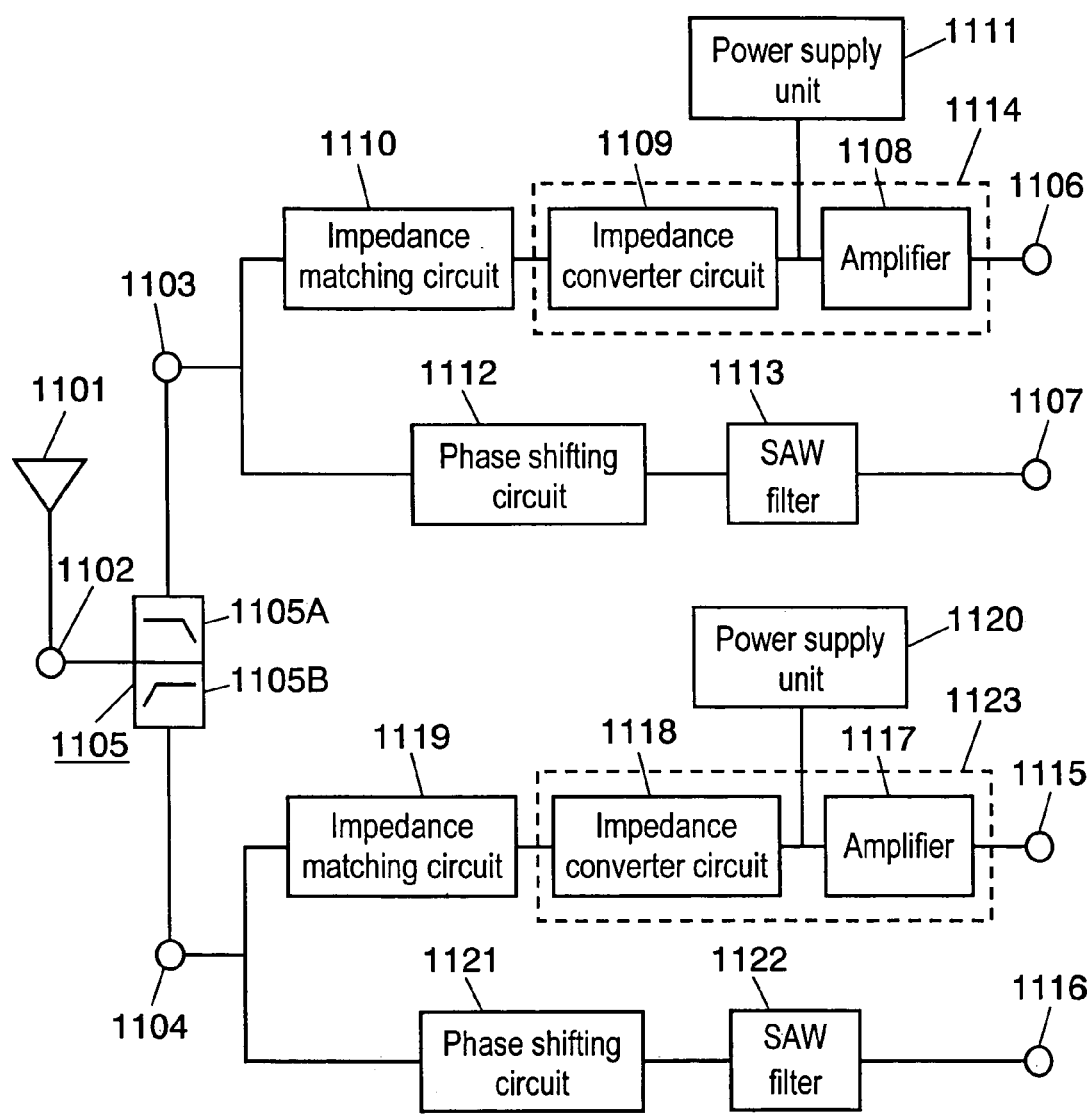
FIG. 11 is a block diagram of a high frequency composite switch module according to a second exemplary embodiment of the present invention.
Figure 12:
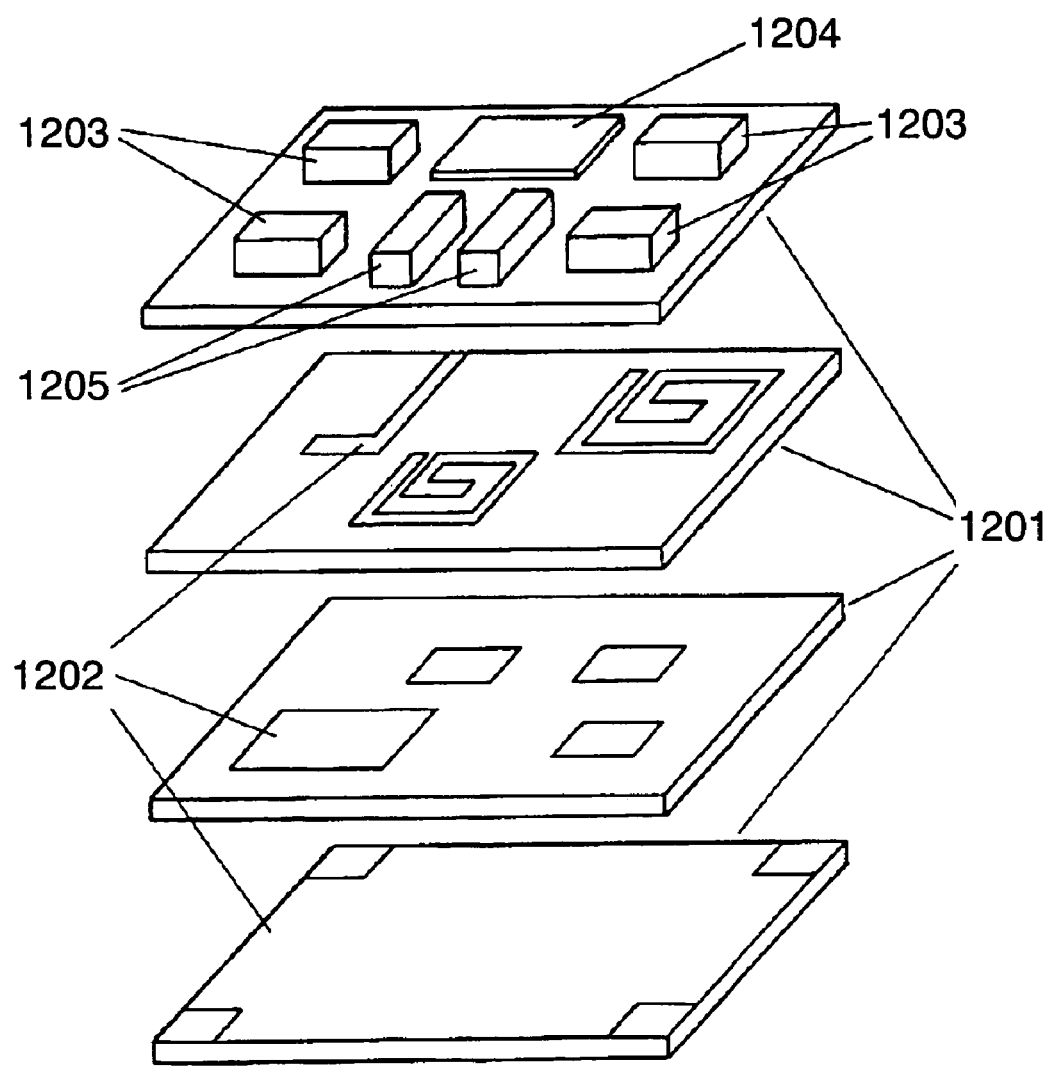
FIG. 12 is an exploded perspective view of a high frequency composite switch module of the prior art.
Figure 13:
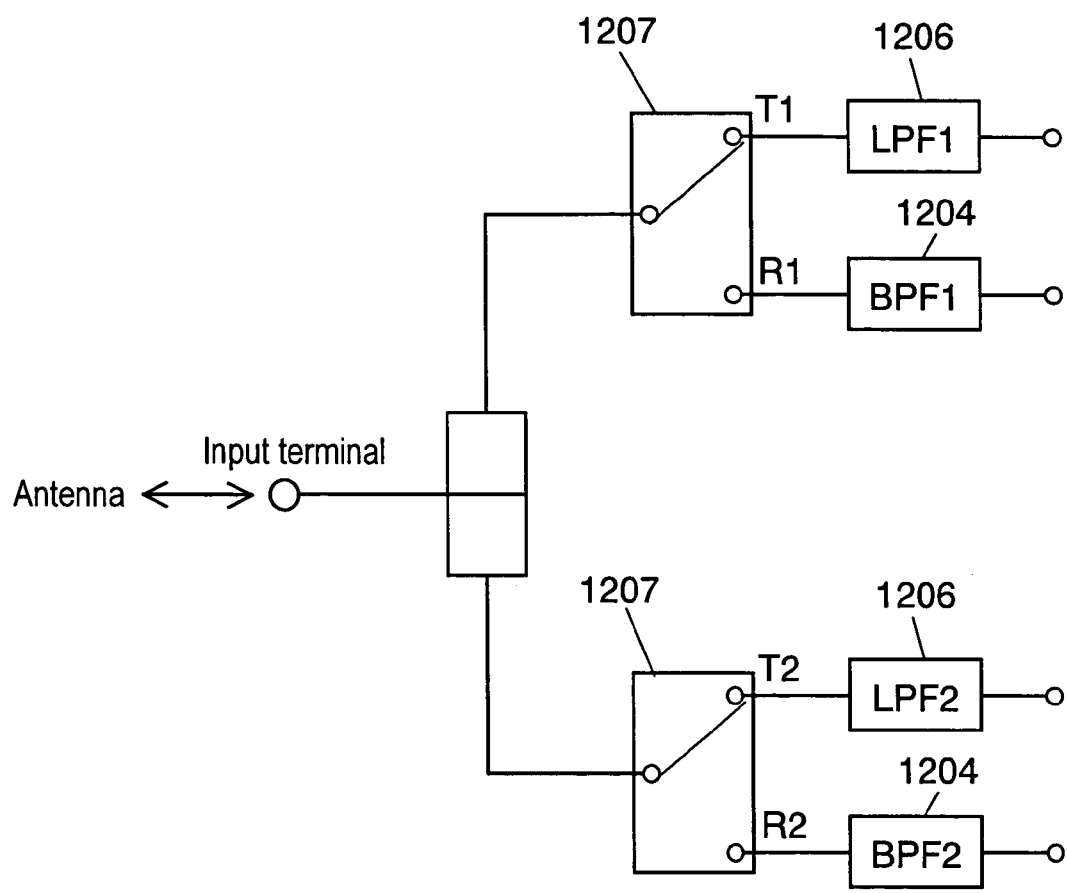
FIG. 13 is a block diagram of the high frequency composite switch module of the prior art.

FIG. 11 is a block diagram of a high frequency composite switch module according to the second exemplary embodiment of the present invention.

The module shown in FIG. 11 enables transmission and reception through two different communication systems. The module has wave splitter circuit 1105. Wave splitter circuit 1105 has common terminal 1102 to be connected to an antenna, first terminal 1103 and second terminal 1104. Each of the first and the second terminals is connected with both a transmitter circuit and a receiver circuit in the same manner as the first exemplary embodiment.

A first transmitter circuit comprising first amplifier 1108, first power supply unit 1111, first impedance converter circuit 1109 and first impedance matching circuit 1110 is connected between first terminal 1103 and first transmission terminals 1106. Here, first impedance converter circuit 1109 and first impedance matching circuit 1110 constitute a first transmitter side impedance converter, of which a function is to pass and reflect first transmission signal and first reception signal respectively to the maximum extent possible.

On the other hand, first receiver circuit comprising first phase shifting circuit 1112 and first SAW filter 1113 is connected between the first terminal 1103 and first receiving terminal 1107. Here, first phase shifting circuit 0.1112 and first SAW filter 1113 constitute a first receiver side impedance converter, of which a function is to pass and reflect the first reception signal and the first transmission signal respectively to the maximum extent. In this structure here, first amplifier 1108 and first impedance converter circuit 1109 are integrated into first IC chip 1114.

Also, a second transmitter circuit comprising second amplifier 1117, second power supply unit 1120, second impedance converter circuit 1118, and second impedance matching circuit 1119 is connected between the second terminal 1104 and second transmission terminal 1115.

Here, second impedance converter circuit 1118 and second impedance matching circuit 1119 constitute a second transmitter side impedance converter, of which a function is to pass and reflect second transmission signal and second reception signal respectively to the maximum extent.

On the other hand, second receiver circuit comprising second phase shifting circuit 1121 and second SAW filter 1122 is connected between second terminal 1104 and second receiving terminal 1116.

Second phase shifting circuit 1121 and second SAW filter 1122 constitute a second receiver side impedance converter, of which a function is to pass and reflect the second reception signal and the second transmission signal respectively to the maximum extent. Here, second amplifier 1117 and second impedance converter circuit 1118 are integrated into second IC chip 1123.

In the module of this exemplary embodiment, first and second impedance matching circuits 1110 and 1119, first and second power supply units 1111 and 1120, and first and second phase shifting circuits 1112 and 1121 are composed of interlayer conductor patterns, each formed between respective two of a plurality of dielectric layers that constitute the multilayer board, in the like manner as the first exemplary embodiment. Also, at least one of first and second IC chips 1114, and 1123, and first and second SAW filters 1113 and 1122 is mounted on the outer surface of the multilayer board.

The module composed as above operates in a manner which will be described hereinafter.

Wave splitter circuit 1105 includes first filter 1105A which has a sufficiently large input/output impedance in the second communication band, and second filter 1105B which also shows a sufficiently large input/output impedance in the first communication band.

Therefore, most of the signal in the first communication band is reflected at the second filter, while most of the signal passes through between common terminal 1102 and first terminal 1103, and the signal hardly appears at second terminal 1104.

Also, most of the signal in the second communication band is reflected at the first filter, while most of the signal passes through between common terminal 1102 and second terminals 1104, and the signal hardly appears at first terminal 1103.

When transmitting a first transmission signal in the first communication band, first power supply unit 1111 supplies a bias current to turn first amplifier 1108 into an operating mode.

The first transmission signal is input from first transmission terminal 1106, and it is input to first impedance converter circuit 1109 after amplified by the first amplifier 1108. There, the impedance is not converted, but the signal is input to first matching circuit 1110 which carries out impedance matching.

A circuit constant of first phase shifting circuit 1112 is set to such a value that makes an input impedance of first SAW filter 1113 in the first transmission frequency band as measured from the first terminal 1103 the highest. In other words, this makes the impedance sufficiently high in a direction from first terminal 1103 toward first receiving terminal 1107. Therefore, most of the first transmission signal is reflected at an input port of the first receiver circuit, and most of the signal is output from first terminal 1103 to common terminal 1102 via wave splitter circuit 1105.

When receiving a first reception signal in the first communication band, the first reception signal received in the antenna is led to first phase shifting circuit 1112 via wave splitter circuit 1105. Then, first SAW filter 1113 passes only signal of the first receiving frequency band, and outputs it to first receiving terminal 1107.

In this instance, a circuit constant of first impedance converter circuit 1109 is set to such a value that makes an impedance of first impedance converter circuit 1109 sufficiently high in the first receiving frequency band as measured from the first terminal 1103. That is, this makes the impedance in the first receiving frequency band sufficiently high in a direction from first terminal 1103 toward first transmission terminal 1106.

Therefore, most of the first reception signal is reflected at an output port of the first transmitter circuit, and most of the first reception signal is output to first receiving terminal 1107.

When transmitting a second transmission signal in the second communication band, second power supply unit 1120 supplies a bias current to turn second amplifier 1117 into an operating mode.

The second transmission signal is input from second transmission terminal 1115, and it is input to second impedance converter circuit 1118 after amplified by second amplifier 1117. There, the impedance is not converted, but the signal is input to second matching circuit 1119 which carries out impedance matching.

A circuit constant of second phase shifting circuit 1121 is set to such a value that makes an input impedance of second SAW filter 1122 measured from second terminal 1104 the highest in the second transmission frequency band. In other words, this makes the impedance sufficiently high in a direction from second terminal 1104 toward second receiving terminal 1116. Therefore, most of the second transmission signal is reflected at an input port of the second receiver circuit, and most of the signal is output from second terminal 1104 to common terminal 1102 via wave splitter circuit 1105.

When receiving a second reception signal in the second communication band, the second reception signal received in the antenna is led to second phase shifting circuit 1121 via wave splitter circuit 1105.

Then, second SAW filter 1122 passes only signal of the second receiving frequency band, and outputs it to second receiving terminal 1116. In this instance, a circuit constant of second impedance converter circuit 1118 is set to such a value that makes an impedance of second impedance converter circuit 1118 sufficiently high in the second receiving frequency band as measured from second terminal 1104. That is, this makes the impedance in the second receiving frequency band sufficiently high in a direction from second terminal 1104 toward second transmission terminal 1115. Therefore, most of the second reception signal is reflected at an output port of the second transmitter circuit, and most of the signal is output to second receiving terminal 1116.

Although the present exemplary embodiment has been described as using two IC chips, each corresponding to the respective communication band, they may be integrated into single IC chip. In this case, it can further reduce a size of the high frequency composite switch module for use with two different communication systems.

Furthermore, although the present exemplary embodiment has been described as using two SAW filters, each corresponding to the respective communication band, they may be combined into one package of SAW filters. This can also reduce the size of the module even further.

Moreover, a varistor may be employed in place of at least one of parallel capacitors among those series inductors and parallel capacitors that constitute wave splitter circuit 1105 of this exemplary embodiment. In this case, the module can be protected from surge voltages and surge currents due to lightning and the like.

In the structure of the present exemplary embodiment, there are numerous variations in the type of the multilayer board and the method of fabrication, structure of the two impedance matching circuits, two power supply circuits and two phase shifting circuits, and the method of forming them in the multilayer board, and structure of the amplifier and the impedance converter circuit, and the method of forming them in the IC chip. However, the present invention is not restrictive only to those detailed above.

As discussed above, the module of this exemplary embodiment is not only adaptable for use with two different communication systems, but also capable of simplifying the module, reducing the size and cost of the module itself, since it includes a circuit that functions as an amplifier as well as a transmitter/receiver switching circuit.

In addition, this module can improve an overall efficiency of transmission and reception of power to and from the antenna since it can reduce a transmission loss as a result of size reduction which shortens a length of the signal line.

INDUSTRIAL APPLICABILITY

According to the present invention, nearly all of high frequency circuits such as the circuit functioning as the power amplifier and the transmission and reception switching circuit, the band-pass filter for reception, and the like can be integrated as one module. The invention can thus make possible a reduction in size and simplification of the mobile communication device which uses this module. With this advantage, the invention can also realize reduction in material and number of the components for the communication device. The invention thus achieves a price reduction of the device. Moreover, this module can decrease a loss of signal by way of shortening and simplifying the signal line. Accordingly, the invention can improve the overall efficiency of the transmission and reception power in the antenna, which gives rise to an improvement in performance of the device.

What is claimed is:

1. A high frequency composite switch module for switching between transmission of a transmission signal and reception of a reception signal using a common terminal, said switch module comprising:
 a) a transmitter circuit for processing said transmission signal,
 said transmitter circuit comprises:
 a transmitter side impedance converter including an impedance matching circuit and an impedance converter circuit, and connected to said common terminal,
 an amplifier for amplifying and outputting said transmission signal to said transmitter side impedance converter, and
 a power supply unit for supplying electric power to said amplifier; and b) a receiver circuit for processing said reception signal, said receiver circuit comprises:
a receiver side impedance converter including a phase shifting circuit and a surface acoustic wave (SAW) filter, and connected to said common terminal,
wherein:
at least one of said impedance matching circuit, said power supply unit and said phase shifting circuit is formed inside a multilayer board comprising a conductor layer and a dielectric layer,
during transmission, said transmitter circuit applies said transmission signal to said phase shifting circuit, said phase shifting circuit having a sufficiently high impedance over a first frequency band of said transmission signal to cause said transmission signal to be reflected at an input port of said receiver circuit, and
during reception, said receiver circuit applies said reception signal to said impedance converter circuit, said impedance converter circuit having a sufficiently high impedance over a second frequency band of said reception signal to cause said reception signal to be reflected at an output port of said transmitter circuit.

2. The high frequency composite switch module as set forth in claim 1, wherein a power supply for said impedance converter circuit is in common with the power supply for said amplifier.

3. The high frequency composite switch module as set forth in claim 1, wherein said impedance converter circuit includes a field-effect transistor.

4. The high frequency composite switch module as set forth in claim 1, wherein said impedance converter circuit includes a switch using a gallium arsenide semi-conductor.

5. The high frequency composite switch module as set forth in claim 1, wherein said impedance converter circuit includes a PIN diode.

6. The high frequency composite switch module as set forth in claim 1, wherein said impedance converter circuit includes a varactor diode.

7. The high frequency composite switch module as set forth in claim 1, wherein a directional coupler is disposed between said impedance matching circuit and said common terminal.

8. The high frequency composite switch module as set forth in claim 7, wherein said directional coupler comprises a conductor pattern formed inside said multilayer board.

9. The high frequency composite switch module as set forth in claim 7, wherein said directional coupler is comprises a conductor pattern coupled electromagnetically to another conductor pattern which functions as a series inductor constituting said impedance matching circuit.

10. The high frequency composite switch module as set forth in claim 1, wherein a direct current blocking capacitor is disposed between said impedance matching circuit and said impedance converter circuit.

11. The high frequency composite switch module as set forth in claim 1, wherein a phase difference equal to an integral multiple of one-half wavelength of any frequency within said second frequency band of said reception signal exists between said impedance converter circuit and said common terminal when said amplifier is not in operation.

12. The high frequency composite switch module as set forth in claim 1, wherein said phase shifting circuit comprises a conductor pattern which functions as a series inductor and a parallel capacitor.

13. The high frequency composite switch module as set forth in claim 1, wherein said SAW filter has 0.8 or greater in level of reflection coefficient to an input in said first frequency band of said transmission signal.

14. The high frequency composite switch module as set forth in claim 1, wherein at least one of parallel capacitors constituting said impedance matching circuit comprises a varistor.

15. The high frequency composite switch module as set forth in claim 1, wherein said amplifier and said impedance converter circuit are integrated in a single IC chip, and said multilayer board is provided with at least one via hole in communication with an area of outer surface where said IC chip is mounted.

16. The high frequency composite switch module as set forth in claim 15, wherein a shielding case is placed to cover said IC chip and said SAW filter, and said shielding case is bonded to said IC chips with conductive resin.

17. The high frequency composite switch module as set forth in claim 1, wherein a silicon dioxide layer is provided between said multilayer board and said SAW filter.

18. The high frequency composite switch module as set forth in claim 15, wherein said multilayer board is provided with a recess in a bottom surface thereof, said IC chip is placed in said recess, a metal plate is bonded to said IC chip with conductive resin in a manner to cover said recess, and said SAW filter is mounted on an upper surface of said multilayer board.

19. The high frequency composite switch module as set forth in claim 1, wherein said multilayer board is provided therein with a room layer.

20. The high frequency composite switch module as set forth in claim 19, wherein said room layer is filled with thermal insulation resin.

21. The high frequency composite switch module as set forth in claim 15, wherein said multilayer board is provided with a groove in an outer surface thereof between said IC chip and said SAW filter mounted on said outer surface.

22. A high frequency composite switch module adapted for a first communication system and a second communication system, said switch module comprising:
a) a wave splitter circuit for separating a first transmission signal and a first reception signal used for said first communication system from a second transmission signal and a second reception signal used for said second communication system;
b) a first transmitter circuit for processing said first transmission signal;
c) a first receiver circuit for processing said first reception signal;
d) a second transmitter circuit for processing said second transmission signal; and
e) a second receiver circuit for processing said second reception signal,
wherein
said first transmitter circuit comprises:
a first transmitter side impedance converter including a first impedance matching circuit and a first impedance converter circuit,
a first amplifier for amplifying said first transmission signal and
a first power supply unit for supplying electric power to said first amplifier,
said second transmitter circuit comprises:
a second transmitter side impedance converter including a second impedance matching circuit and a second impedance converter circuit,
a second amplifier for amplifying said second transmission signal and a second power supply unit for supplying electric power to said second amplifier, wherein said first receiver circuit comprises a first phase shifting circuit, and a first SAW filter, and said second receiver circuit comprises a second phase shifting circuit, and a second SAW filter, wherein at least one of said first and second impedance matching circuits, said first and second power supply units, and said first and second phase shifting circuits is formed inside a multilayer board comprising a conductor layer and a dielectric layer, during transmission, said first transmitter circuit applies said first transmission signal to said first phase shifting circuit, said first phase shifting circuit having a sufficiently high impedance over a first frequency band of said first transmission signal to cause said first transmission signal to be reflected at an input port of said first receiver circuit, during transmission, said second transmitter circuit applies said second transmission signal to said second phase shifting circuit, said second phase shifting circuit having a sufficiently high impedance over a second frequency band of said second transmission signal to cause said second transmission signal to be reflected at an input port of said second receiver circuit, during reception, said first receiver circuit applies said first reception signal to said first impedance converter circuit, said first impedance converter circuit having a sufficiently high impedance over a third frequency band of said first reception signal to cause said first reception signal to be reflected at an output port of said first transmitter circuit, and during reception, said second receiver circuit applies said second reception signal to said second impedance converter circuit, said second impedance converter circuit having sufficiently high impedance over a fourth frequency band of said second reception signal to cause said second reception signal to be reflected at an output port of said second transmitter circuit.

23. The high frequency composite switch module as set forth in claim 22, wherein said first amplifier and said first impedance converter circuit are formed in a first IC chip, said second amplifier and said second impedance converter circuit are formed in a second IC chip, and said first IC chip and said second IC chip are formed in a single IC chip.

24. The high frequency composite switch module as set forth in claim 22, wherein said first SAW filter and said second SAW filter are formed in one SAW filter.

25. The high frequency composite switch module as set forth in claim 22, wherein at least one of parallel capacitors constituting said wave splitter circuit comprises a varistor.

26. A mobile communication device for performing transmission and reception, said communication device employing the high frequency composite switch module as set forth in any of claim 1 through claim 25.

27. A high frequency composite module according to claim 1, wherein impedance of said SAW filter is increased responsive to said phase shifting circuit receiving said transmission signal in said first frequency band, and impedance of said impedance converter circuit is increased responsive to said impedance converter circuit receiving said reception signal in said second frequency band.

* * * * *